United States Patent
McNall

(10) Patent No.: US 11,312,425 B2
(45) Date of Patent: Apr. 26, 2022

(54) HINGED AND SECTIONED DROP-IN FLATBED SIDE RAILS

(71) Applicant: Misty McNall, Enterprise, OR (US)

(72) Inventor: Misty McNall, Enterprise, OR (US)

(*) Notice: Subject to any disclaimer, the term of this patent is extended or adjusted under 35 U.S.C. 154(b) by 210 days.

(21) Appl. No.: 16/746,905

(22) Filed: Jan. 19, 2020

(65) Prior Publication Data
US 2021/0221447 A1 Jul. 22, 2021

(51) Int. Cl.
*B62D 33/02* (2006.01)
*B60P 7/08* (2006.01)
*B62D 33/033* (2006.01)
*B62D 33/08* (2006.01)

(52) U.S. Cl.
CPC ........ *B62D 33/0207* (2013.01); *B60P 7/0807* (2013.01); *B62D 33/033* (2013.01); *B62D 33/08* (2013.01)

(58) Field of Classification Search
CPC .............. B62D 33/0207; B62D 33/033; B62D 33/0222; B62D 33/03; B62D 33/02; B62D 33/08; B62D 63/061
USPC ........ 296/36, 43, 186.4, 32, 3, 57.1, 100.18, 296/183.1, 51, 61, 95.1, 97.22; 410/106, 410/110, 121, 101, 102, 104, 116, 143, 410/144, 32, 94
See application file for complete search history.

(56) References Cited

U.S. PATENT DOCUMENTS

| | | | | |
|---|---|---|---|---|
| 4,216,988 A * | 8/1980 | Weiss | ..................... | B62D 33/03 296/10 |
| 6,152,510 A * | 11/2000 | Newsome | ............ | B62D 33/023 296/10 |
| 6,536,824 B2 * | 3/2003 | Anderson | .............. | B62D 27/00 296/186.4 |
| 7,708,299 B2 * | 5/2010 | Duval | .................. | B62D 63/061 280/401 |
| 2010/0224848 A1 * | 9/2010 | Singer | ................... | A01M 29/30 256/25 |
| 2015/0015018 A1 * | 1/2015 | Lee | ......................... | B60P 1/003 296/36 |

* cited by examiner

Primary Examiner — D Glenn Dayoan
Assistant Examiner — Sunsurraye Westbrook
(74) Attorney, Agent, or Firm — Lyman Moulton, Esq.; Moulton Patents, PLLC

(57) ABSTRACT

A disclosed flatbed truck side rail and stake pocket system includes side rail sections for each lateral side of the flatbed, wherein each side rail comprises at least one hinge attached at a first hinge plate wherein the side rails together span each lateral side of the flatbed. Also, stake stubs are each attached to a second hinge plate of each at least one hinge and are configured drop-in receivable into a stake pocket in the flatbed. Additionally, a stake in a lateral side of the flatbed supports the siderails via a spring loaded pin inserted through the stake and into at least one side rail. Furthermore, a flatbed comprising a traverse pocket underneath the flatbed and behind a rear license plate is disclosed. The traverse pocket comprises rails configured to receive at least one loading ramp and latch it therein.

19 Claims, 6 Drawing Sheets

HINGED AND SECTIONED DROP-IN FLATBED SIDE RAILS

BACKGROUND OF THE INVENTION

Field of Invention

The present invention relates to a flatbed for a truck with side rails and loading ramp.

Description of Related Art

A flatbed truck is a type of truck which can be either towed or have four wheels. As the name suggests, its bodywork is just an entirely flat, level 'bed' with no sides or roof. This allows for quick and easy loading of goods, and consequently they are used to transport heavy loads that are not delicate or vulnerable to rain, and also for abnormal loads that require more space than is available on a closed body.

A flatbed has a solid bed, usually of wooden planks. Since there is no roof and no fixed sides, provision is required to secure loads. To retain the load there are often low sides which may be hinged down for loading, as a 'drop-side' truck. A 'stake truck' has no sides but has steel upright pillars, which may be removable, again used to retain the load.

SUMMARY OF THE DISCLOSURE

A disclosed flatbed truck side rail and stake pocket system includes side rail sections for each lateral side of the flatbed, wherein each side rail comprises at least one hinge attached at a first hinge plate and the side rails together span each lateral side of the flatbed. Also, stake stubs are each attached to a second hinge plate of each at least one hinge and are configured drop-in receivable into a stake pocket. Additionally, a stake for a lateral side of the flatbed and a spring loaded pin are configured to be received into the stake proximal one end and into the side rail(s) adjacent the one end. Furthermore, a flatbed comprising a traverse pocket underneath the flatbed and behind a rear license plate is disclosed. The traverse pocket comprises rails configured to receive at least one loading ramp and latch it therein.

Other aspects and advantages of embodiments of the disclosure will become apparent from the following detailed description, taken in conjunction with the accompanying drawings, illustrated by way of example of the principles of the disclosure.

Figure 1:
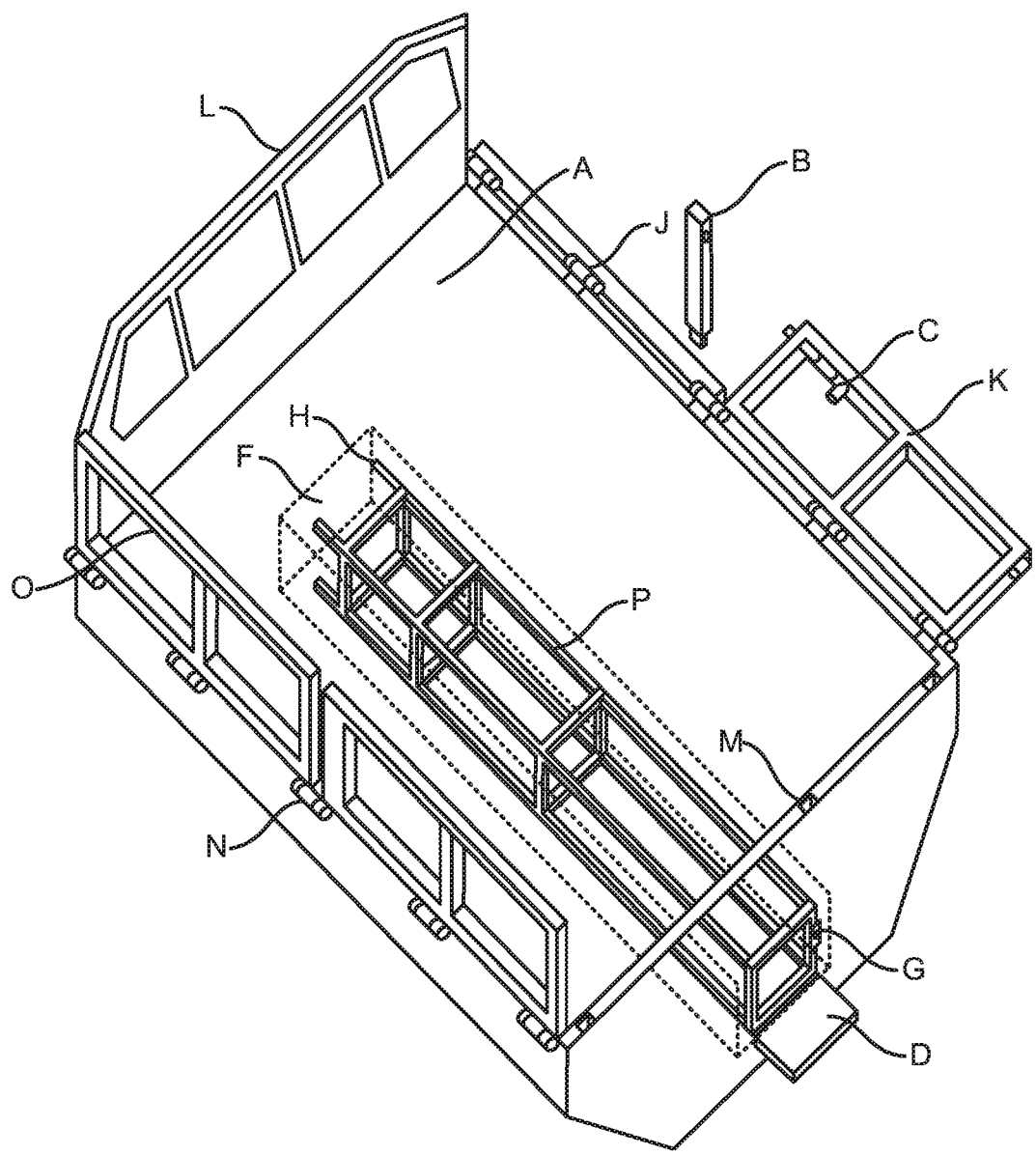
FIG. 1 depicts a top perspective view of the hinged and sectioned drop-in flatbed side rails according to an embodiment of the present disclosure.

Throughout the description, same and similar reference numbers may be used to identify same and similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'drop-in,' refers to a stake or a stake stub falling into position in a stake pocket under the force of gravity and retained therein under the force of gravity.

FIG. 1 depicts a top perspective view of the hinged and sectioned drop-in flatbed side rails according to an embodiment of the present disclosure. The depiction includes the flat bed A, a removable stake B, a side rail section latching pin C, a fold down license plate holder D, a ramp storage F, a flip latch G, a ramp stop H, a folded down side rail section J, and a partially folded down side rail section K, a headache front rail L, a typical stake pocket M, a typical side rail hinge N, an upright side rail section O, and traverse pocket rails P configured to hold and store a loading ramp (not depicted).

Figure 2:
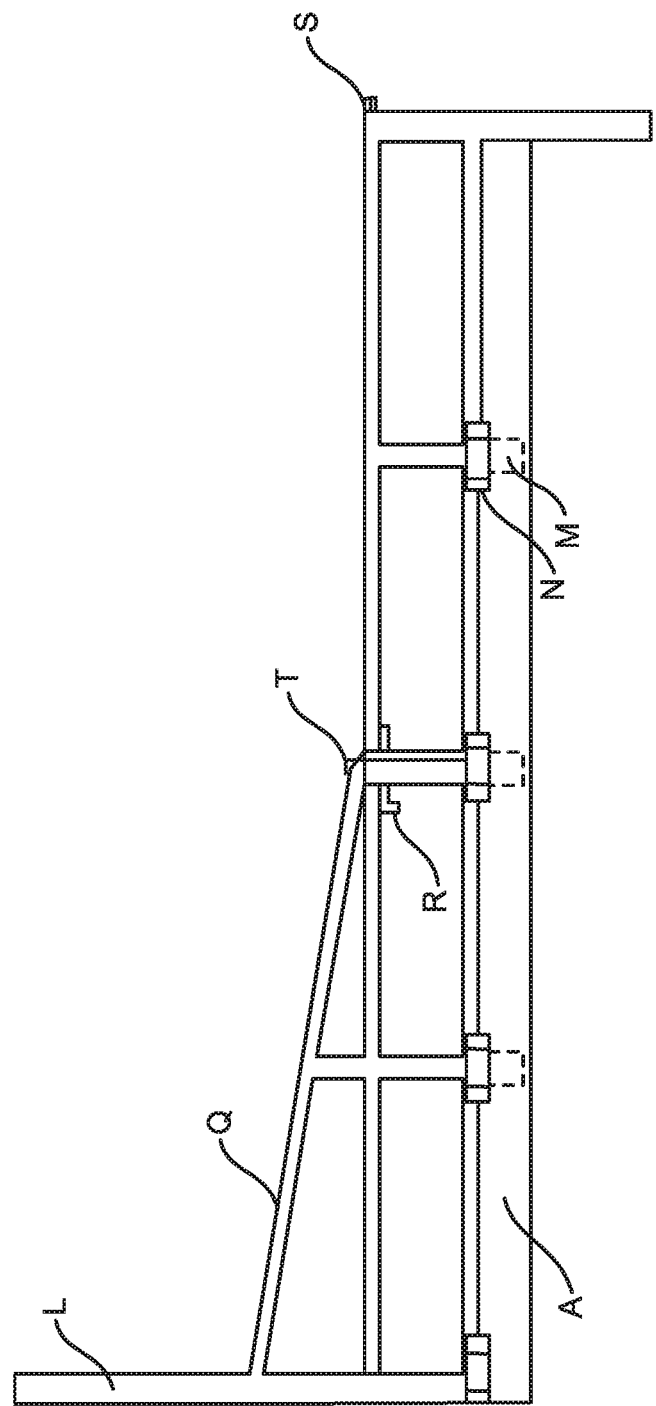
FIG. 2 depicts a side elevational view of the hinged and sectioned drop-in flatbed side rails in accordance with an embodiment of the present disclosure.

FIG. 2 depicts a side elevational view of the hinged and sectioned drop-in flatbed side rails in accordance with an embodiment of the present disclosure. The depiction includes the features and associated reference characters for similar and same limitations depicted in other drawings herein. The depiction additionally includes the sloping side rail section Q, the latching pin R between the headache rail portion and the sloping rail portion, the latching pin S for the rear rail section to the side rail section O, the hinges N, the stake pockets M shown in broken lines and the stake T between the two side rail sections.

Figure 3:
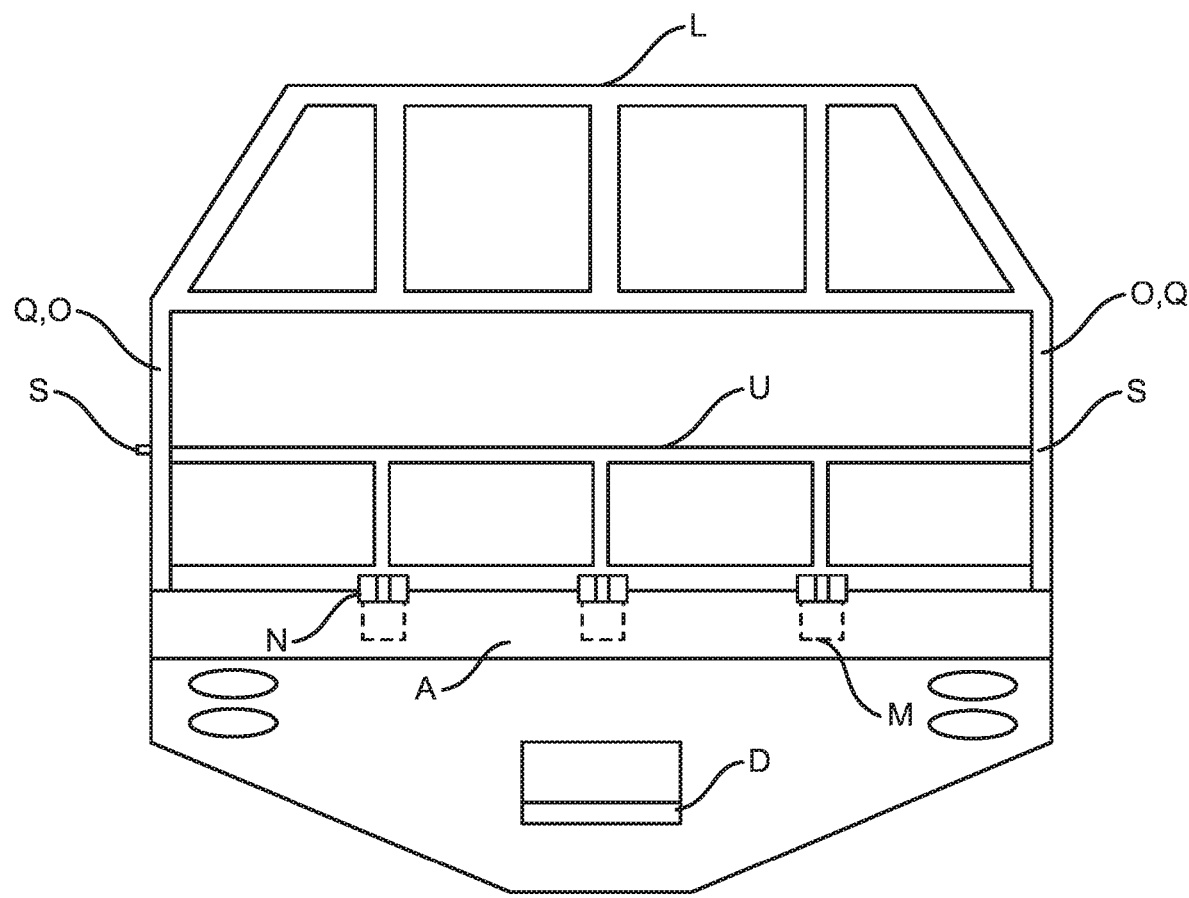
FIG. 3 depicts a rear elevational view of the hinged and sectioned drop-in flatbed side rails in accordance with an embodiment of the present disclosure.

FIG. 3 depicts a rear elevational view of the hinged and sectioned drop-in flatbed side rails in accordance with an embodiment of the present disclosure. The depiction includes the features and associated reference characters for similar and same limitations depicted in other drawings herein including the sloping side rail panels Q, the latch pins S, the headache side rail section L, the stake pockets M shown in broken lines, the hinges N and the folding license plate cover D. The depiction additionally includes the rear side rail panel section U.

Figure 4:
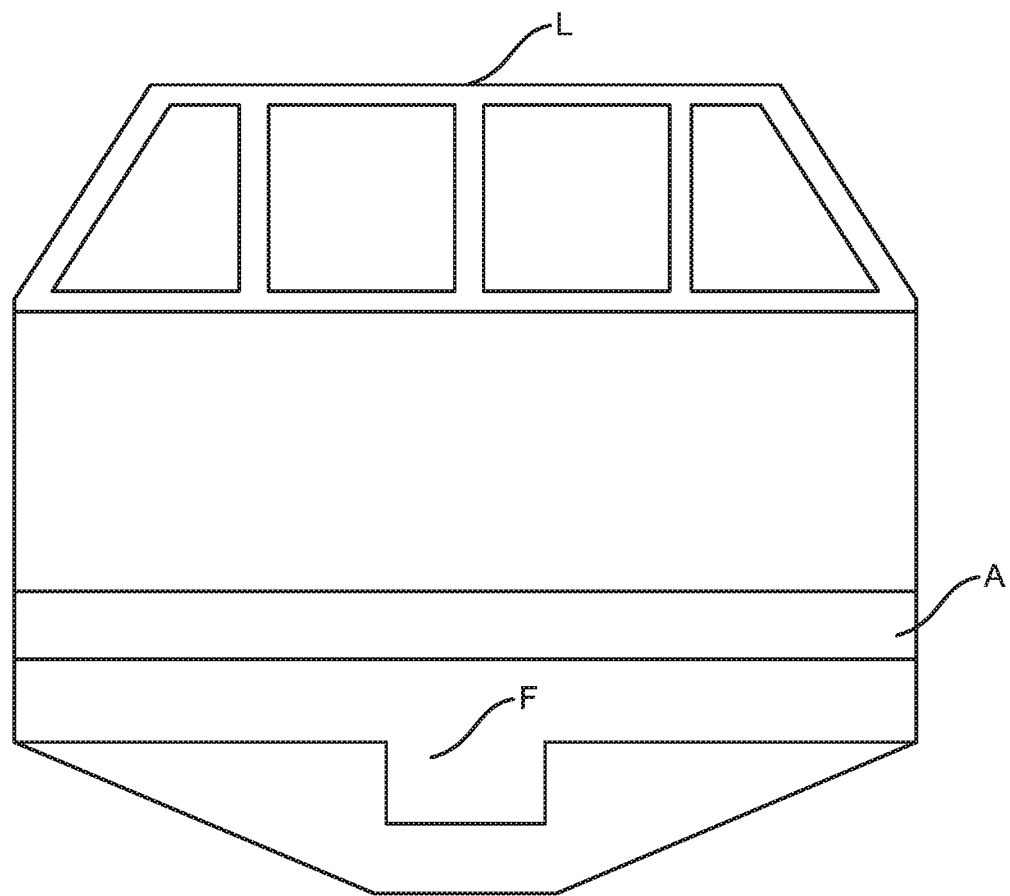
FIG. 4 depicts a front elevational view of the hinged and sectioned drop-in flatbed side said in accordance with an embodiment of the present disclosure.

FIG. 4 depicts a front elevational view of the hinged and sectioned drop-in flatbed in accordance with an embodiment of the present disclosure. The depiction includes some of the features and associated reference characters for similar and same limitations depicted in other drawings herein including the flatbed A, the ramp storage F and the headache panel L.

Figure 5:
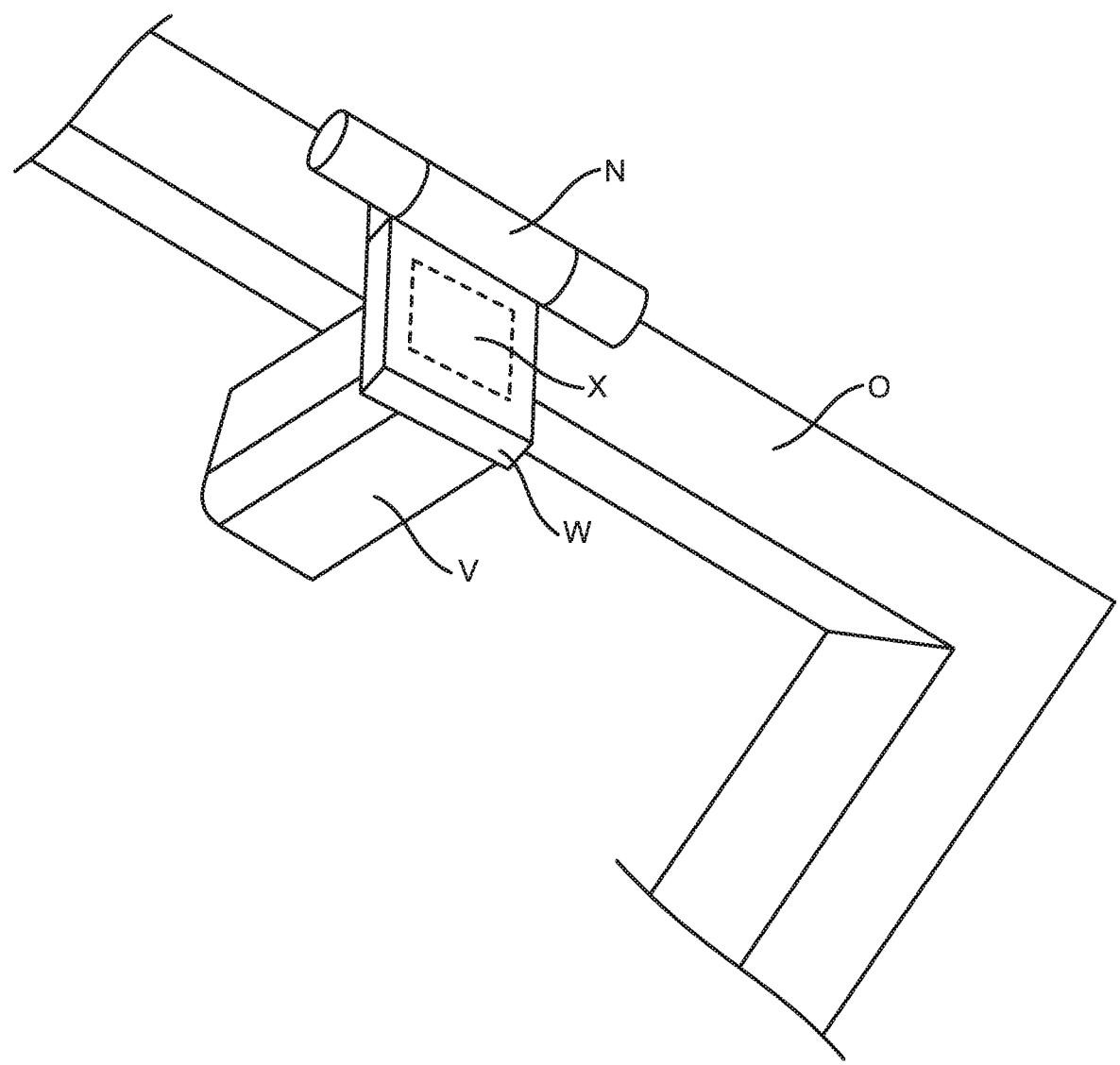
FIG. 5 depicts a drop-in stake stub detail attached to a bottom of a side rail section in accordance with an embodiment of the present disclosure.

FIG. 5 depicts a drop-in stake stub detail attached to a bottom of a side rail section in accordance with an embodiment of the present disclosure. The depiction includes the features and associated reference characters for similar and same limitations depicted in other drawings herein including the side rail section O and the hinge N. The depiction additionally includes the stake stub V, the hinge plate W and the channel opening defined by the broken lines X. The opening X in embodiments of the disclosure allow a stake such as B or T to drop-in there through into a stake pocket occupied by a stake stub. In the present depiction the hinge plate W is solid.

Figure 6:
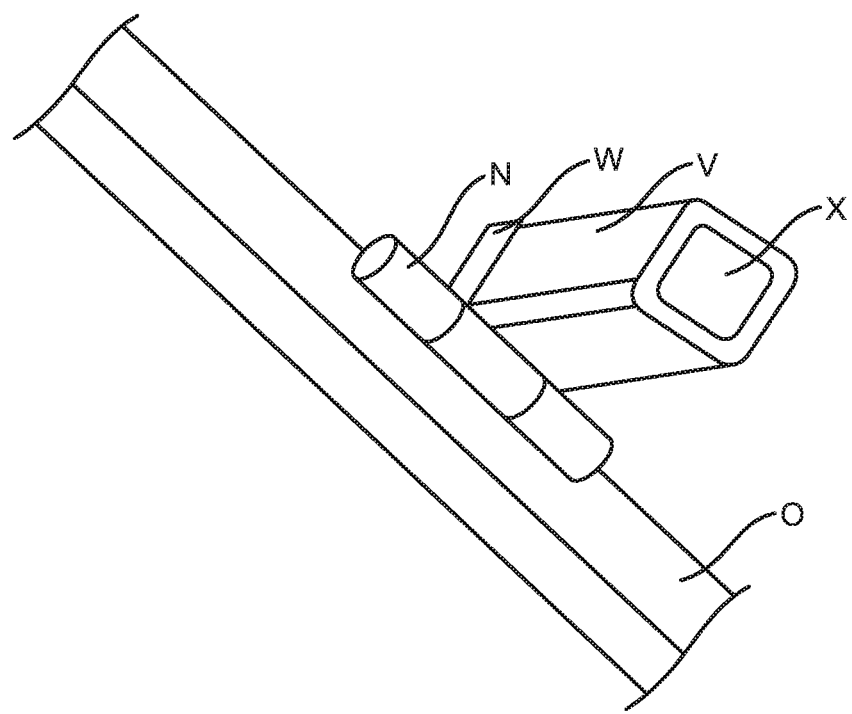
FIG. 6 depicts the drop-in stake stub detail in a drop-in position in accordance with an embodiment of the present disclosure.

FIG. 6 depicts the drop-in stake stub detail in a drop-in position in accordance with an embodiment of the present disclosure. The depiction includes the features and associated reference characters for similar and same limitations depicted in other drawings herein. The opening X defined in the channel of the side rail section O is open and uncovered by a hinge plate.

Other features and limitations include a rack tool box that is disposed adjacent a side rail section (not shown). Also, a larger or multiple traverse pockets for additional or larger loading ramps are include in embodiments. A raise and turn hinge is also included in embodiments which allows a locking of a side rail section without the locking pins.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. Side rails for a flatbed truck with a flatbed and stake pockets comprising:
   a plurality of side rails for each lateral side of the flatbed, wherein each side rail comprises at least one hinge attached at a first hinge plate and the side rails together span each lateral side of the flatbed;
   a plurality of stake stubs each attached to a second hinge plate of each at least one hinge and are configured drop-in receivable into a stake pocket;
   a stake for a lateral side of the flatbed and a spring loaded pin configured to be received into the stake proximal one end and into the side rail(s) adjacent the one end, and
   a pocket disposed under the flatbed and behind a rear license plate, the pocket comprising rails configured to receive at least one loading ramp.

2. The side rails of claim 1, further comprising at least one back end rail comprising at least two hinges each attached at a first hinge plate above a stake pocket and at least two stake stubs each attached to a second hinge plate of each at least two hinges and drop-in receivable into a stake pocket.

3. The side rails of claim 1, wherein the plurality of side rails comprise 2 each side rail sections comprising an equal length and a gap there between for the stake.

4. The side rails of claim 1, wherein each stake stub comprises a nominal four inch length channel stock welded to the second hinge plate.

5. The side rails of claim 1, wherein the hinges are capable of at least 180 degree rotation to a side of the flatbed truck to a 270 degree rotation onto the flatbed of the truck.

6. The side rails of claim 1, further comprising a back rail section configured to latch to at least one of the lateral side rails via a sliding pin and receiving knuckles on an end of each lateral rail.

7. The side rails of claim 1, further comprising a front rail configured to latch to at least one of the lateral side rails via a sliding pin and receiving knuckles on an end of a respective lateral rail.

8. The side rails of claim 1, wherein the plurality of side rails comprise metal channel stock configured in a window pane pattern.

9. The side rails of claim 1, further comprising a bracket disposed in a bottom side of a stake pocket comprising a loop for fastening straps, chains, rope and other securing equipment.

10. A flatbed truck side rail and stake pocket system with a flatbed, comprising:
    a plurality of side rails for each lateral side of the flatbed, wherein each side rail comprises at least one hinge attached at a first hinge plate and the side rails together span each lateral side of the flatbed;
    a plurality of stake stubs each attached to a second hinge plate of each at least one hinge and are configured drop-in receivable into a stake pocket;
    a stake for a lateral side of the flatbed and a spring loaded pin configured to be received into the stake proximal one end and into the side rail(s) adjacent the one end; and
    a flatbed comprising a traverse pocket underneath the flatbed and behind a rear license plate, the traverse pocket comprising rails configured to receive at least one loading ramp.

11. The system of claim 10, further comprising at least one back end rail including at least two hinges each attached at a first hinge plate above a stake pocket and at least two stake stubs each attached to a second hinge plate of each at least two hinges and drop-in receivable into a stake pocket.

12. The side rails of claim 10, wherein the plurality of side rails comprise 2 each side rail sections comprising an equal length and a gap there between for the stake.

13. The side rails of claim 10, wherein each stake stub comprises a nominal four inch length channel stock welded to the second hinge plate.

14. The side rails of claim 10, further comprising a pocket disposed under the flatbed and behind a rear license plate, the pocket comprising rails configured to receive at least one loading ramp.

15. The side rails of claim 10, wherein the hinges are capable of at least 180 degree rotation to a side of the flatbed truck to a 270 degree rotation onto the flatbed of the truck.

16. The side rails of claim 10, further comprising a back rail section configured to latch to at least one of the lateral side rails via a sliding pin and receiving knuckles on an end of each lateral rail.

17. The side rails of claim 10, further comprising a front rail configured to latch to at least one of the lateral side rails via a sliding pin and receiving knuckles on an end of a respective lateral rail.

18. The side rails of claim 10, wherein the plurality of side rails comprise metal channel stock configured in a window pane pattern.

19. The side rails of claim 10, further comprising a bracket disposed in a bottom side of a stake pocket comprising a loop for fastening straps, chains, rope and other securing equipment.

\* \* \* \* \*